United States Patent [19]

Yamashita et al.

[11] Patent Number: 5,173,361
[45] Date of Patent: Dec. 22, 1992

[54] STAINLESS STEEL FIBER REINFORCED COMPOSITE BELT

[75] Inventors: Hiroaki Yamashita, Shiki; Takashi Toyota, Hirakata, both of Japan

[73] Assignees: Nippon Steel Chemical Co., Tokyo; Tsubakimoto Chain Co., Osaka, both of Japan

[21] Appl. No.: 642,501

[22] Filed: Jan. 17, 1991

[30] Foreign Application Priority Data

Jan. 22, 1990 [JP] Japan .................. 2-10559

[51] Int. Cl.⁵ .................. B32B 7/00; B60B 9/04; F16G 1/00; D04H 1/00
[52] U.S. Cl. .................. 428/245; 152/527; 152/558; 152/559; 428/288; 428/294; 428/903; 428/909; 474/238; 474/242; 474/260; 474/263; 474/265
[58] Field of Search .................. 152/527, 558, 559; 474/238, 260, 242, 263, 265; 428/294, 245, 288, 903, 909

[56] References Cited

U.S. PATENT DOCUMENTS

| | | | |
|---|---|---|---|
| 2,446,310 | 8/1948 | Steinke | 474/263 |
| 3,090,716 | 5/1963 | Stevens | 474/263 |
| 3,469,512 | 9/1969 | Marzocchi et al. | 474/263 |
| 3,631,667 | 1/1972 | Marzocchi | 152/559 |
| 3,667,308 | 6/1972 | Schwab et al. | 474/263 |
| 4,026,162 | 5/1977 | Berg | 74/231 |

FOREIGN PATENT DOCUMENTS 0182650 5/1986 European Pat. Off.
0199545 10/1986 European Pat. Off.
63-180749 7/1988 Japan.

OTHER PUBLICATIONS

Patent Abstracts of Japan, vol. 12, No. 454 (M-769)[3301], Nov. 29, 1988 & JP-A-63 180 749 (Hitachi) Jul. 25, 1988.

*Primary Examiner*—George F. Lesmes
*Assistant Examiner*—James D. Withers
*Attorney, Agent, or Firm*—Armstrong & Kubovcik

[57] ABSTRACT

A fiber reinforced composite belt in which a stainless steel fiber aggregate having a diameter of from 5 to 50 μm and impregnated with 1 to 10% by weight of a thermosetting resin such as an epoxy resin is buried as a reinforcing material in a base material for belt, and a process for preparing the above-mentioned fiber reinforced composite belt are provided. This fiber reinforced composite belt is much more excellent in flex resistance, durability, water resistance and coefficient of linear expansion, as compared with not only a rubber belt and a synthetic resin elastomer belt but also belts reinforced by directly burying a stainless steel fiber and a steel fiber in the rubber.

4 Claims, 1 Drawing Sheet

STAINLESS STEEL FIBER REINFORCED COMPOSITE BELT

BACKGROUND OF THE INVENTION (i) Field of the Invention

The present invention relates to a fiber reinforced composite belt, and more specifically, it relates to a stainless steel fiber reinforced belt desirable as a conveyor belt or a drive belt.

(ii) Description of the Prior Art

In general, a belt is fundamentally constituted of a metal, a plastic, a rubber or the like. Of these three kinds of materials, the belts basically made of the rubber are used in many fields and have a large demand, and therefore they are now utilized in a greater amount than the belts made of the metal and the plastic. Because the belts made of the metal and the plastic have drawbacks inherent in these materials, i.e., the metal tends to rust and the plastic is brittle (deterioration easily occurs). With regard to these two drawbacks, the belts made of the rubber do not have any problems. However, the belts made of the rubber are fundamentally poorer in mechanical strength, as compared with the belts made of the metal and the plastic. The various kinds of rubber belts have been used so far which have been synthesized by modifying the basic structures of the rubbers, but the rubber belts are no match for the metal belts in point of strength. For the improvement of the strength, other types of rubber belts have been used which are reinforced by disposing various fibers in the rotation direction of the rubber belts, and known examples of the above-mentioned fibers include a steel fiber, a glass fiber, an aramid fiber and a carbon fiber. However, the steel fiber inconveniently tends to rust. In Japanese Patent Publication No. 62-34547, another type of belt has been suggested in which an anti-corrosive agent synthesized from a paraffin base mineral oil or a naphthene base mineral oil is applied and buried. However, the suggested process is not considered to be satisfactory, because the process is complicated and slide occurs between the rubber and the reinforcing fiber. The glass fiber and the aramid fiber also have problems of hygroscopicity and the like. Furthermore, when used in the drive belt, a synthetic fiber, an organic fiber and the like generate a strange noise at the time of the rotation of the belt owing to a difference in coefficient of linear expansion between the fiber and a metal. In some cases, rotational frequency goes wrong, and incorrect operation occurs sometimes. As understood from the foregoing, the belts which are reinforced with the various fibers have the improved strength but involve other problems, and it cannot be recognized that these belts meet all the requirements.

As described above, in each of a metal fiber such as the steel fiber, inorganic fibers such as the glass fiber and the carbon fiber, and an organic fiber such as the aramid fiber, there are some advantages and disadvantages, and it is desired to develop a composite belt having all of these advantages.

SUMMARY OF THE INVENTION

An object of the present invention is to provide a fiber reinforced composite belt having improved strength as well as improved corrosion resistance, workability and water resistance, and these improved characteristics can be obtained by a relatively easy means.

Aspects of the present invention are as follows:

1. A fiber reinforced composite belt comprising a stainless steel fiber aggregate impregnated with a matrix resin being buried as a reinforcing material in a base material for belt.

2. The fiber reinforced composite belt according to the paragraph 1 wherein the amount of the matrix resin with which the fiber aggregate is impregnated is in the range of from 1 to 10% by weight of the weight of the impregnated fiber aggregate.

3. The fiber reinforced composite belt according to the paragraph 1 wherein the matrix resin is at least one selected from the group consisting of an epoxy resin, a phenolic resin, an unsaturated polyester resin, a polyimide resin and a furan resin.

4. The fiber reinforced composite belt according to the paragraph 3 wherein the matrix resin is an epoxy resin.

5. The fiber reinforced composite belt according to the paragraph 1 or 2 wherein the stainless steel fiber aggregate is composed of monofilaments each having a diameter of from 5 to 50 $\mu$m.

6. The fiber reinforced composite belt according to the paragraph 1 or 2 wherein the stainless steel fiber aggregate is a fiber aggregate prepared by twining the plural stainless steel aggregates together.

7. A process for preparing a fiber reinforced composite belt which comprises the steps of impregnating a stainless steel fiber aggregate with a thermosetting resin as a matrix resin, heating, curing, forming a composite, so that stainless steel monofilaments adhere to one another, and then burying the composite in a base material for belt.

8. The process for preparing a fiber reinforced composite belt according to the paragraph 7 wherein prior to burying the composite containing the stainless steel fiber aggregate in the rubber base material for belt, the stainless steel fiber aggregate is subjected to a RLF treatment in a treating bath containing resorcin (R), a rubber latex (L) and formalin (F) in order to treat the adhesive surface of the stainless steel fiber aggregate.

9. The process for preparing a fiber reinforced composite belt according to the paragraph 8 wherein the coating amount of the RLF treating agent is in the range of from 30 to 40% by volume in terms of a volume ratio of the RLF treating agent film to the reinforcing material on which a treating agent film has been formed.

10. The process for preparing a fiber reinforced composite belt according to the paragraph 8 wherein prior to being buried in the rubber base material for belt, the reinforcing material which has been subjected to the RLF treatment is coated with at least one selected from the group consisting of an epoxy adhesive, a urethane adhesive and an isocyanate adhesive.

DETAILED DESCRIPTION OF THE PREFERRED EMBODIMENTS

Figure 1A:
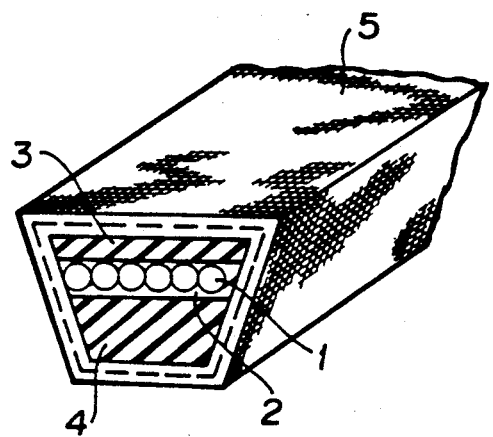
FIGS. 1 (a) and (b) show embodiments of the present invention, and FIG. 1 (a) is a perspective sectional view of a V belt and FIG. 1 (b) is a perspective sectional view of a synchronous belt.

Now, the present invention will be described in detail.

In the first place, a stainless steel fiber used in the present invention is a fiber prepared from a stainless steel mentioned in a usual steel standard and the like by a known means. The reason why the stainless steel is employed is that it is more excellent in corrosion resistance, as compared with usual steels.

Next, a stainless fiber aggregate means a bundle of hundreds or thousands of monofilaments of the above-mentioned stainless steel fiber, and the diameter of each monofilament is preferably from 5 to 50 $\mu m$, more preferably 7 to 15 $\mu m$. When the diameter of the monofilament is in excess of 50 $\mu m$ and in case that the curvature of a prepared belt is small, the belt is bent, so that it is folded or curved, with the result that the function of the belt cannot be exerted. On the other hand, when the diameter of the monofilament is less than 5 $\mu m$, the manufacture of the monofilaments themselves is difficult, and in bundling the monofilaments into the fiber aggregate, the filaments tend to break. In addition, such fine filaments cannot provide sufficient strength as the reinforcing material at times.

The most important gist of the present invention is that the above-mentioned stainless aggregate or, if necessary, a fiber aggregate obtained by twining the plural aggregates together is impregnated with a matrix resin. That is, in the present invention, the fiber aggregate itself alone is not used as the reinforcing material. The fiber aggregate is impregnated with a thermosetting resin as the matrix resin, heated, then cured for the preparation of a composite, whereby the stainless steel monofilaments are allowed to adhere to one another. In consequence, the strength of the reinforcing material is not given by the aggregate of the monofilaments alone but by the integral material of the aggregate and the matrix resin. Therefore, the integral material is much more excellent in durability and flex resistance, as compared with a belt in which the aggregate of the stainless steel fiber is directly buried in a rubber for belt.

The reinforcing material used in the present invention has the above-mentioned structure, and therefore it is more excellent in anticorrosion and flex resistance, as compared with a conventional reinforcing material comprising the steel fiber or the combination of the steel fiber and an anticorrosive agent, and it is also extremely excellent in durability.

Examples of the matrix resin which can be used in this case include thermosetting resins, particularly an epoxy resin is preferable, and other usable thermosetting resins are a phenol resin, an unsaturated polyester resin, a polyimide resin, a furan resin and the like.

The impregnation amount of the matrix resin is preferably in the range of from 1 to 10% by weight, preferably from 3 to 5% by weight, of the weight of the impregnated fiber aggregate. When the impregnation amount of the matrix resin is less than 1% by weight, the fiber aggregate cannot be integrated sufficiently, so that satisfactory strength cannot be obtained. On the other hand, when the impregnation amount of the matrix resin is in excess of 10% by weight, the resin tends to crack or peel, when the manufactured belt containing such a fiber aggregate is used.

The thus constituted fiber aggregate is buried as the reinforcing material in a rubber which is a base material for belt, but prior to the burying step, the reinforcing material can be subjected to a RLF treatment with a view to improving the adhesion of the reinforcing material to the rubber. This RLF treatment is a known means and can be achieved by using a treating bath containing resorcin (R), a rubber latex (L) and formalin (F). The RLF treatment permits improving the flexibility of the reinforcing material itself and protecting the reinforcing material from folding and breaking in addition to the intended effect, i.e., the improvement of the adhesive properties of the reinforcing material to the rubber. The amount of the RLF treating agent depends upon the thickness of its film which will be formed on the surface of the reinforcing material, but it is suitably from 30 to 40% by volume in terms of a volume ratio of the RLF treating agent film to the reinforcing material on which a treating agent film has been formed. When the amount of the RLF treating agent film is more than 40% by volume, the volume ratio of the RLF-treated reinforcing material to the belt increases, and the strength of the belt itself deteriorates. Furthermore, since the adhesive area between the reinforcing material and the rubber increases, shearing strength is heightened, with the result that adhesive force lowers. On the other hand, when the amount of the RLF treating agent is less than 30% by volume, the effect of the RLF treatment is not so much as expected.

If necessary, the reinforcing material which has already been subjected to the RLF treatment may be further coated with a known adhesive. Examples of the usable adhesive include known adhesives such as epoxy, urethane and isocyanate adhesives.

The thus constituted reinforcing material is buried in the base material for belt, but in this case, the reinforcing material is disposed in a direction substantially in parallel with the frictional surface direction, i.e., the rotational direction of the belt, but it may be slightly inclined at an angle of about 30° or less. In this case, the base material for belt is a rubber which is usually used as a tension member for belt, or an elastic material similar to the rubber. This kind of base material for belt is molded into the form of a belt, and the reinforcing material is then buried in the substantially central portion of the base material for belt by a known means in order to produce a reinforcing layer. Afterward, the base material for belt containing the reinforcing layer is usually sandwiched between rubber members having a desirable morphology in compliance with the use purpose of the belt, and at least one portion of the periphery of the belt is then coated with a cover fabric for the belt. In this case, for the adhesion of the rubber members to both the surfaces of the belt and the adhesion of the cover fabric, a known adhesive can be suitably selected. The reinforcing layer can be formed as follows: For example, a belt-like rubber ring having a length corresponding to the peripheral length of the belt is prepared, and the reinforcing material is then wound helically and continuously around this ring so as to form a wide reinforcing layer material. Afterward, the layer material is cut in reinforcing layers having a desired belt width.

Now, the present invention will be described in more detail in reference to embodiments shown in drawings.

Figure 1B:
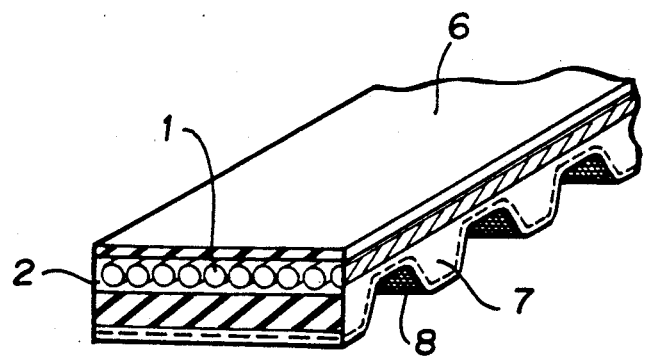

FIG. 1 shows an embodiment of a composite belt of the present invention, and FIG. 1 (a) is a sectional perspective view of a V belt, and FIG. 1 (b) is a sectional perspective view of a synchronous belt. In the first place, with regard to the V belt shown in FIG. 1 (a), a reinforcing layer 2 in which a reinforcing material 1 is buried is allowed to adhere to an upper rubber member 3 and a lower rubber member 4 which have previously been molded substantially into V shape in its sectional view, with the reinforcing layer 2 sandwiched between these rubber members 3 and 4. Next, the whole periphery of the incorporated rubber members 2, 3 and 4 is covered with a cover fabric 5 having excellent durability which can be used for the usual belt. Furthermore, with regard to the synchronous belt shown in FIG. 1 (b), the reinforcing layer 2 in which a reinforcing material 1 is buried is allowed to adhere to a backing rubber member 6 and a synchronous belt rubber member 7 which has been molded into the form of gear teeth, with the reinforcing layer 2 sandwiched between these rubber members 6 and 7. Next, the synchronous belt rubber 7 is covered with a facing fabric 8 having excellent durability along the shape of the gear teeth.

In the above-mentioned embodiment, the typical belts having the usual shapes have been shown, but the present invention can be applied to all of the other belts which can usually be used.

The belt having the above-mentioned constitution is very excellent in strength in contrast to a conventional rubber belt, and it is also more excellent in durability and water resistance, as compared with belts made of a rubber and a synthetic resin elastomer. In the belt in which the stainless steel fiber aggregate impregnated with the matrix resin is used as the reinforcing material, any corrosion does not breed in contrast to a belt containing a metal fiber such as a steel fiber as the reinforcing material, and water resistance is excellent in contrast to the organic fiber, and the stainless steel itself has about the same coefficient of linear expansion as in a metal which is the material for constitutional parts of the rotators for the belt. Accordingly, the belt of the present invention can solve some problems of the belts which have heretofore been indicated, and thus it is fair to say that the belt of the present invention has the very excellent industrial effects.

EXAMPLES

Now, the present invention will be described in more detail in reference to examples, but the scope of the present invention should not be limited to these examples.

EXAMPLE 1

Three stainless steel fiber aggregates each comprising 1,500 filaments of 15 $\mu$m in diameter were bundled and then twisted. Afterward, Epicoat 828 (a trade mark of Yuka Shell Inc.) which was an epoxy resin as a matrix resin was mixed with a curing agent, and the aggregate was impregnated with the resulting mixture, heated, and then cured in order to obtain a reinforcing material containing 4% by weight of the impregnated resin. The reinforcing material was further subjected to a known RLF treatment so that the coating amount of a treating material might be 30% by volume, and it was finally coated with an isocyanate adhesive in order to obtain the reinforcing material containing the stainless steel fiber aggregates. Afterward, the thus obtained reinforcing material was buried in the central portion of a drive belt having a V shape shown in FIG. 1 (a) in a usual manner by the use of known materials so as to have the constitution shown in the same drawing. The thus obtained drive belt was excellent in strength, water resistance and anticorrosion and did not generate any strange noise at the time of the rotation of the belt, and in short, this kind of belt was very satisfactory.

Comparative Example 1

Three steel fiber aggregates each comprising 500 filaments of 80 $\mu$m in diameter were bundled and then twisted. Afterward, the same treatment as in Example 1 was effected in order to obtain a reinforcing material containing the steel fiber aggregates, and these fiber aggregates were buried in the central portion of the drive belt in the same manner as in Example 1.

With regard to the thus obtained drive belt, permanent strain occurred in the steel fiber of the reinforcing material, when the curvature of the belt was decreased. In addition, corrosion bred on the steel fiber, when the drive belt was used for a long period of time.

Comparative Example 2

Three aramid fiber aggregates each comprising 1,000 filaments of 13 $\mu$m in diameter were bundled and then twisted. Afterward, the same treatment as in Example 1 was effected in order to obtain a reinforcing material containing the aramid fiber aggregates, and these fiber aggregates were buried in the central portion of the drive belt in the same manner as in Example 1.

With regard to the thus obtained drive belt, water resistance was poor because of the fiber aggregates being an organic fiber, and a strange noise was generated owing to a difference of coefficient of thermal expansion between the fiber aggregates and a metal on the basis of a temperature difference of circumstances.

What is claimed is:

1. A fiber reinforced composite belt comprising a stainless steel fiber aggregate impregnated with a thermosetting matrix resin being buried as a reinforcing material in an elastomeric base material for belt wherein the amount of matrix resin with which the fiber aggregate is impregnated is in the range of from 1 to 10 weight percent based on the weight of the impregnated fiber aggregate, said stainless steel fiber aggregate comprising monofilaments each having a diameter of from 5 to 50 microns.

2. The fiber reinforced composite belt according to claim 1 wherein the matrix resin is at least one thermosetting resin selected from the group consisting of an epoxy resin, a phenolic resin, an unsaturated polyester resin, a polyimide resin and a furan resin.

3. The fiber reinforced composite belt according to claim 1 wherein the matrix resin is an epoxy resin.

4. The fiber reinforced composite belt according to claim 1 wherein the stainless steel fiber aggregate is a fiber aggregate prepared by twining plural stainless steel aggregates together.

* * * * *